Aug. 3, 1954
R. P. DUNMIRE
2,685,537
APPARATUS FOR THE COATING OF PELLETS
Filed March 5, 1948
2 Sheets-Sheet 2
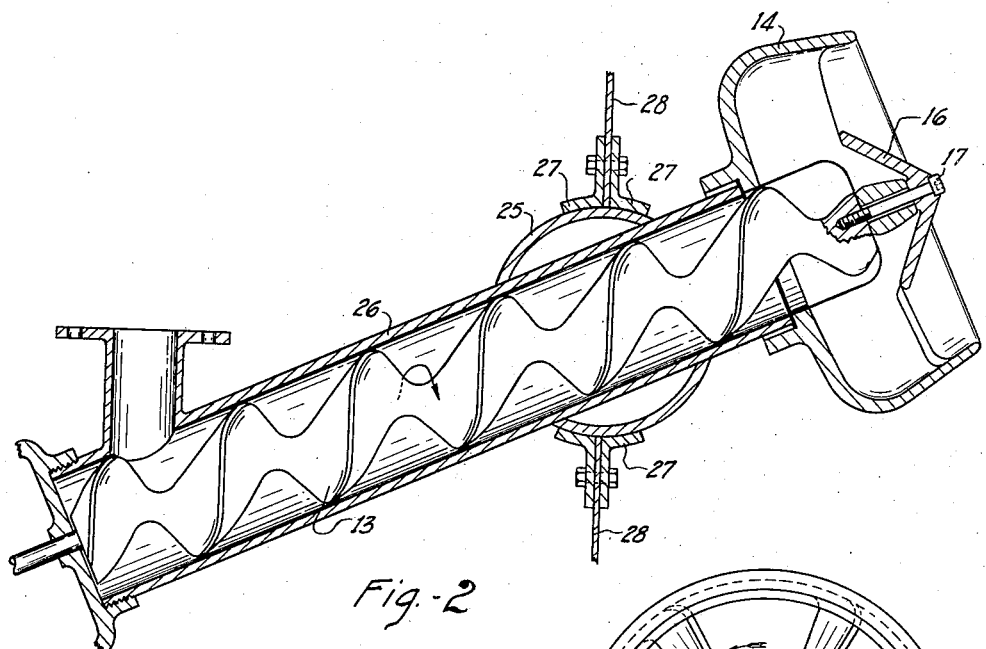
Fig.-2
Fig.-4
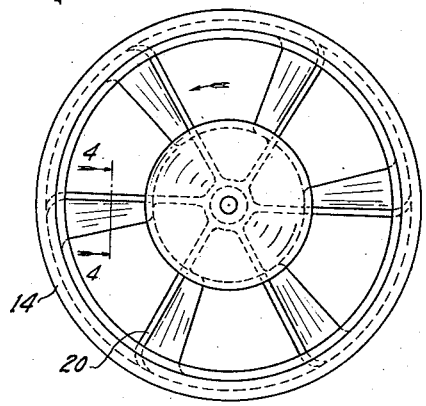
Fig.-3
INVENTOR:
RUSSELL P. DUNMIRE
BY Gordon C. Mack
ATTORNEY Patented Aug. 3, 1954

2,685,537

UNITED STATES PATENT OFFICE 2,685,537

APPARATUS FOR THE COATING OF PELLETS

Russell Paul Dunmire, Chagrin Falls, Ohio

Application March 5, 1948, Serial No. 13,185

2 Claims. (Cl. 118—20)

This invention relates to the coating of pellets or the like. The pellets may be hardened spray particles or wafers; they may be cast or died or formed in any suitable manner, and may be of any size up to—for example—½ inch or more in the longest dimension.

The invention relates particularly to apparatus for the coating of pellets of hardened fat or other edible material which contains a high concentration of a vitamin or other food supplement such as hormone, sterol, mineral, etc. or mixture thereof, such as, for example, hydrogenated soya bean oil, with a high concentration of provitamin A suitable for admixture with animal feed. For this purpose the soya bean oil is preferably hydrogenated to a melting point of 130 to 150° F. or thereabout. Other oils or fats similarly hardened may be employed. Pellets 5 to 50 thousandths of an inch—and preferably about 30 thousandths—in their longest dimension are a good size for mixing in mashes of finely divided grains, etc. Pellets ranging from 50 to 125 thousandths of an inch in their longest dimension may be mixed with scratch feed for fowl, and for mixture with cattle feeds. Larger pellets may be individually administered to humans and other animals.

The pellets may be formed by compressing finely divided materials of any suitable composition, using a binder as necessary. The finely divided material may be particles of hydrogenated fat. In a preferred form of the invention, whole cereal grains suitably bonded together are employed. Ground grain or other food product, etc. may be used. Such pellets suitably coated are particularly suited for admixture with feeding mashes. The grain, etc. and if ground either before or after grinding, may be impregnated with vitamin or other suitable supplement, preferably in oil solution; or the food supplement may be mixed with whatever bonding material is employed. The impregnating material may serve as the bonding material. Vitamin-bearing oils, hydrogenated oils, sterols, syrups, etc. may be used as the impregnating and/or bonding material. The treated material is pressed or otherwise formed into pellets of a suitable size. Whole grains, suitably impregnated, may be individually coated without compression with other grains or any other matter, and the term "pellet" as used herein includes such individual grains and products resulting from the adherence of a plurality of grains, and products resulting from adherence of ground grain particles, as well as pellets which are formed of homogeneous plastic carrier material such as hydrogenated fat, etc.

According to this invention the pellets to be coated are ejected first through a chamber containing a mist of a spray material which is relatively easily dried or set, and hence into a drying chamber. If the spray contains solvent, it is quickly volatilized from the pellets during flight in this second chamber and carried off in the atmosphere. If the spray is of molten material, it is cooled and hardened in this second chamber. The preferred spray material is a solution of water-soluble cellulose derivative, viz., hydroxyethyl cellulose, which is desirable for coating the vitamin-containing pellets because it is water-soluble and easily digestible, and because food supplements such as vitamins A, D and E which are oil-soluble, do not penetrate this coating. Other non-toxic, edible impervious coating materials may be used, and if the food supplement is water soluble the coating may be of a material not soluble in water, but soluble in organic solvents. The coatings which may be employed include for example natural resins and gums such as tragacanth, etc., various cellulosic materials, sterols, hydrogenated fats, etc. The coating protects the vitamins, etc. at or near the surface of the pellets from oxidation and may also protect them from the effects of light, heat and moisture so as to prolong their potency.

The coatings may be colored. Opaque filler may be used to protect a pellet from the light. The pellets may be any desired shape. Colors and distinctive shapes may be employed for the purpose of visual analysis.

In a preferred form of equipment, the spray and pellets are charged with opposite electric charges as they enter the chamber. The spray is thus drawn to the pellets which thus are coated more rapidly than when electric charges are not used.

The invention will be further described in connection with the accompanying drawings, in which Fig. 1 is a side view, mostly in section, of a preferred form of double-chambered spray tower and accessory equipment;

Fig. 2 is a detail of the screw conveyor, shown in section;

Fig. 3 is an end view of the projector head; and

Fig. 4 is a section on the line 4—4 of Fig. 3.

Figure 1:
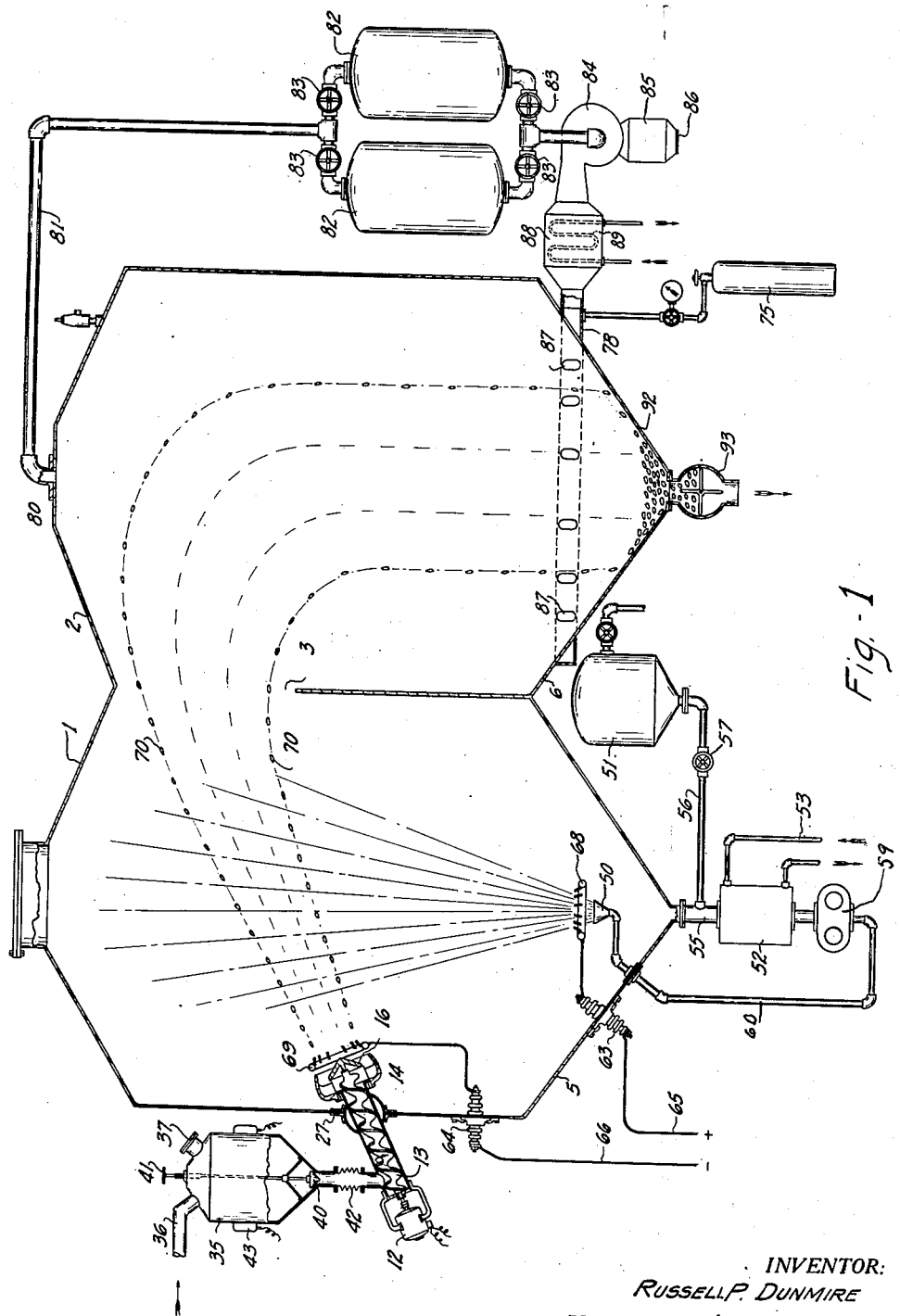

The pellets may be little larger than dust particles although they must be large enough to be projected through one chamber into the other. They may be much larger, and the nature of the projection equipment and the size of the towers, etc. will be adjusted to accommodate conditions.

The chambers may be of any shape, but are preferably rectangular in cross-section (or at least have a single wall separating them) so that the passageway connecting them is no longer than the separating wall is thick. The pellets are projected across chamber 1 which is filled with spray or mist, and allowed to settle in chamber 2 which is relatively free of suspended particles of the spray. Chamber 1 need be no wider than the path of the projected pellets. It need not be as tall as the chamber 2 which must be tall enough to permit the coating to dry or set before the objects settle to the bottom of it. The opening 3 between the chambers need be no larger than the limits of the trajectory of the pellets to be coated.

The pellets are preferably individually hurled through the mist of coating to create no more than a minimum current in the gases in the coating chamber 1 so that no more of the finely divided coating material than is necessary is carried over to the settling chamber 2. In the apparatus shown in the drawings the objects are hurled by the centrifugal projector which is shown in some detail in Figs. 2–4. It is equipped with the driving motor 12 which drives the screw conveyor 13 as well as the projection head 14. The diameter of the head being much greater than the diameter of the conveyor, the circumferential speed of the head is considerably greater than the circumferential speed of the conveyor. Over the projection head is the deflector plate 16 which is fastened to the end of the conveyor 13 by the bolt 17. Pellets brought up by the conveyor are deflected into the head 14 by the deflector plate. The pellets or other objects are thrown by centrifugal force to the outer wall of the head and the combined action of this wall and the vanes 20 throws them out through the coating chamber 1. They start through the chamber along a path substantially parallel to the axis of the screw 13.

The trajectory of the objects is controlled by varying the speed of the motor 12. As the speed of the motor is changed, it may be desirable to alter the angle of the conveyor 13, etc. For this purpose, a ball joint 25 is fastened to the housing 26 of the conveyor. This ball joint is held between the attachment plates 27 bolted to the wall 28 of the chamber 1. Thus, the conveyor may be moved to any desired angle.

The pellets or other objects are charged to the pellet supply hopper 35 through the inlet pipe 36. This may be done by carrying the pellets in a stream of non-oxidizing gas, such as nitrogen. (Air may be used for non-oxidizable objects.) A screened vent 37 is provided for discharge of the carrying gas. The conical valve 40 operated by the handwheel 41 controls the flow of pellets, etc. to the conveyor. The hopper 35 is connected to the conveyor through the conveyor through the flexible connection 42 which permits adjustment of the conveyor to any angle without changing the position of the hopper. The vibrators 43 facilitate the flow of pellets from the hopper to the conveyor by preventing arching in the hopper, etc.

The coating material is sprayed up into the coating chamber 1 through the atomizing nozzle 50. The drawings illustrate equipment for use with a spray solution from which solvent is to be evaporated. The solution is supplied from the storage tank 51 through the heater 52 heated by steam circulated through pipe 53. If hydroxyethyl cellulose coating is used it is advantageously heated so that the particles of spray as they enter the chamber are at a temperature of about 200 degrees F. Heating the spray, whatever its composition, facilitates drying.

The bottom of the chamber 1 is advantageously conical so that spray settling to the bottom collects at the center and drains into the outlet 55. Here it is joined by coating delivered from the storage tank through the pipe 56. The flow of coating from the storage tank is controlled by the valve 57. The circulating pump 59 delivers the coating under pressure, through pipe 60, to the atomizing nozzle 50. A pump which discharges the coating at a pressure of about 200 pounds per square inch will usually give a satisfactory spray. The coating is thus sprayed into the chamber without diluting gases which would necessitate removal of the gases thus introduced. This would necessitate removal of spray from these gases and careful control of conditions to prevent spray from the spray chamber 1 being carried to the collection chamber 2.

The spray chamber 1 is provided with electrically insulated openings 63 and 64 through which the positive and negative cables 65 and 66 pass. These are connected with the ionization rings 68 and 69 at the atomizer and the pellet projector to charge the spray or mist positively, and the pellets negatively. The ionization rings are equipped with needle points so that maximum stresses may be reached in the nitrogen atmosphere without flash-over. Thus, maximum charges are given to both the pellets and the coating material. The ionization rings are suitably supported by insulated braces or the like, and are spaced to give maximum ionization.

As the pellets 70 are projected through the ionized area around ring 69, they receive a negative charge. The spray or mist particles are given a positive charge as they pass through the ionized area around ring 68. Thus the coating spray or mist is attracted to the oppositely charged pellets.

The electrostatic charges may be derived from any suitable source. A high voltage, for example, in the neighborhood of 100,000 volts is desirable. Whatever the source, it will ordinarily be located near the spray chamber.

The collection chamber 2 is equipped with means for circulating hot gases through it to dry the coating as rapidly as possible. For the pellets of fat an atmosphere of nitrogen will be used to advantage. The coating is hot, so only a minimum rise in temperature is required. The gas from the storage tank 75 or other source of supply mixes with heated used gases and enters the collection chamber 2 through ports 77 which lead into it from the duct 78. Here it rises counter-current to the descending coated pellets. It heats the pellets, supplies latent heat for vaporization of moisture or other solvent in the coating and carries off the liberated vapor. It passes from the top of the chamber through opening 80 into the pipe 81 which leads it to one of the two silica-gel driers 82 (which are operated alternatively so that the one not in use may be dried). The flow is controlled by valves 83.

The dried gas is recirculated by the fan or Rotoclone 84 which is provided with the collection hopper 85 from which fines, carried over by the gas, are emptied through the discharge door 86. The gases from the fan pass through the heating chamber 88 where they are heated by the steam line 89. They are advantageously heated to a temperature just below that at which the pellets or coating soften. A small amount of fresh gas from the storage tank 75 is mixed with this heated gas, continuously or at intervals, to replace gases lost through leakage, etc.

The height of the chamber 2 is such that the coating on the pellets or the like is dry by the time the pellets reach its bottom. A conical bottom 92 and rotary discharge gate 93 deliver the coated pellets to bags or other receiving means. They may be cooled before packaging if this is desirable.

If aqueous hydroxyethyl cellulose is used as the coating, any practical percentage of solids may be used provided the solution is not too viscous. This will vary with the type of apparatus employed. The higher the concentration, the more quickly the coating will dry. The coating need be no more than a very small fraction of an inch thick, just enough to completely cover each pellet and exclude the air. Opaque filler may be used in the solution if exclusion of light is also desired.

Although the specification relates more particularly to the preparation of digestible pellets containing food supplement, the apparatus may be used for other operations. The food supplement may comprise one or more vitamins, harmones, mineral components, etc.

What I claim is:

1. Apparatus for coating pellets which includes a vessel divided vertically by a wall in the upper part of which there is an opening of substantial dimensions in all directions, the bottom of each chamber sloping downwardly substantially conically toward the center, in the wall of the first chamber opposite said opening means for projecting pellets across the first chamber and through the opening, a spray device in the first chamber for spraying liquid coating material into the path of pellets projected from the said projecting means, ionization rings immediately surrounding the projecting means and the spray device for oppositely charging the pellets and the spray as they enter the first chamber, a gas inlet and outlet in the second chamber connected with means for circulating gas into and out of the second chamber to dry the coating on pellets entering the second chamber through said opening, and means associated with the gas inlet for heating gas introduced into the second chamber.

2. Apparatus for coating pellets which comprises a first and second chamber, with an opening connecting the two, means in the wall of the first chamber opposite the opening for projecting pellets across the first chamber and through the opening into the second chamber, means for spraying liquid into the first chamber, means for imparting an electrostatic charge to the pellets as they are projected in to the first chamber, and means for imparting an opposite electrostatic charge to the spray particles entering the first chamber, and in the second chamber, a gas inlet and outlet with means for heating and circulating a gas therethough in order to dry the coated particles as they pass therethrough.

References Cited in the file of this patent

UNITED STATES PATENTS

| Number | Name | Date |
|---|---|---|
| Re. 20,119 | Sommer | Sept. 22, 1936 |
| 1,178,279 | Uffel | Mar. 4, 1916 |
| 1,310,037 | Snelling | July 15, 1919 |
| 1,830,489 | Sproat | Nov. 3, 1931 |
| 1,854,100 | Brito | Apr. 12, 1932 |
| 1,869,235 | Bartling | July 26, 1932 |
| 2,253,319 | Batterman | Aug. 19, 1941 |
| 2,270,341 | Ransburg | Jan. 20, 1942 |
| 2,279,106 | Brown | Mar. 7, 1942 |
| 2,302,511 | Wallach | Nov. 17, 1942 |
| 2,329,694 | Bodman | Sept. 21, 1943 |
| 2,399,717 | Arveson | May 7, 1946 |
| 2,410,417 | Andersen | Nov. 5, 1946 |
| 2,480,103 | Fux | Aug. 30, 1949 |